United States Patent [19]

Harsha

[11] 4,106,476
[45] Aug. 15, 1978

[54] DOOR FOR FIREPLACE SCREEN

[75] Inventor: Robert W. Harsha, Oregon City, Oreg.

[73] Assignee: Pacific Fireplace Furnishings, Inc., Portland, Oreg.

[21] Appl. No.: 700,524

[22] Filed: Jun. 28, 1976

[51] Int. Cl.² .............................................. F24C 15/04
[52] U.S. Cl. ..................................... 126/140; 52/657;
126/202; 160/118; 403/231; 403/401
[58] Field of Search ....................... 126/139, 140, 202;
160/118, 206, 229 R; 52/656, 657; 403/401,
402, 231; 16/158, 90, 91, 93; 308/2

[56] References Cited

U.S. PATENT DOCUMENTS

| 878,830 | 2/1908 | Sisson | 52/656 X |
|---|---|---|---|
| 1,561,470 | 11/1925 | Kihm | 52/657 |
| 2,028,918 | 1/1936 | Panza | 160/229 R |
| 2,040,191 | 5/1936 | Wanders | 16/158 X |
| 2,268,669 | 1/1942 | Moore | 160/229 R |
| 2,331,822 | 10/1943 | Zechiel et al. | 160/206 |
| 2,703,159 | 3/1955 | Fleet | 52/657 X |
| 2,767,814 | 10/1956 | Johnson | 52/657 X |
| 3,372,689 | 3/1968 | Goudy | 126/140 |
| 3,709,533 | 1/1973 | Walters | 52/656 X |
| 3,913,558 | 10/1975 | Caldwell | 126/140 X |
| 3,985,461 | 10/1976 | Gebhard | 403/401 X |
| 4,027,650 | 6/1977 | Edwards | 126/140 |

FOREIGN PATENT DOCUMENTS 274,115  10/1965  Australia ................................ 403/231

Primary Examiner—William F. O'Dea
Assistant Examiner—Harold Joyce
Attorney, Agent, or Firm—Lee R. Schermerhorn

[57] ABSTRACT

This door omits the usual metal frame for supporting a pane of glass. Hinges are mounted on channel trim strips on the adjacent edges of a pair of the glass panes to provide a two panel folding door. The lower hinge has a spring catch to hold the door closed. The trim strips are secured in assembled relation on the horizontal and vertical edges of the glass by snap fit engagement with four corner connectors within the channels, without screws or welds. On one of the panels two of the corner connectors have pivot posts for mounting the door in a stationary frame and on the other panel two of the corner connectors have guide posts which slide in grooves in said frame. Thus the trim strips and corner connectors themselves form a frame for the glass in each door panel.

4 Claims, 9 Drawing Figures

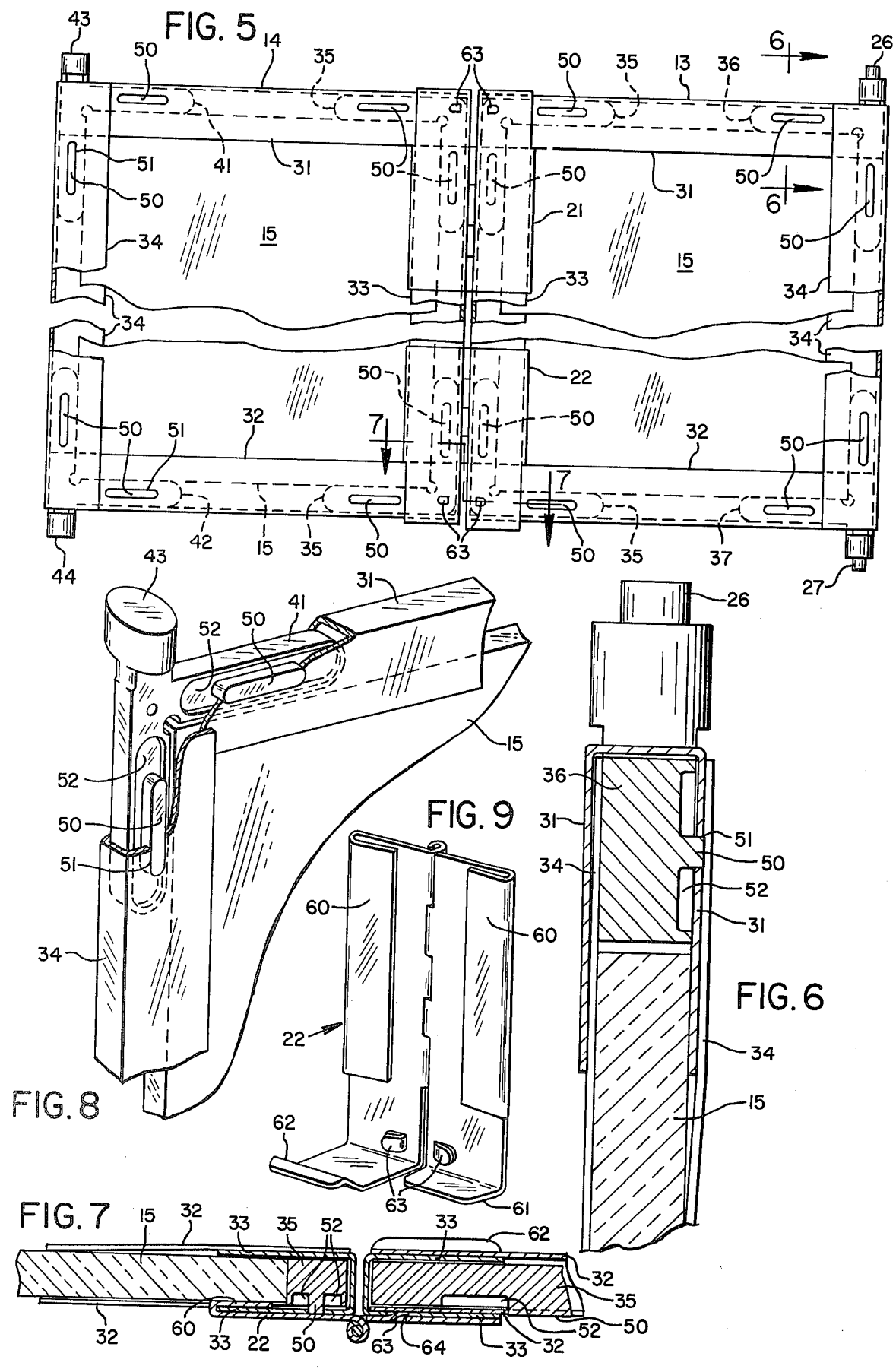

DOOR FOR FIREPLACE SCREEN

BACKGROUND OF THE INVENTION

This invention relates to improvements in a glass door for a fireplace screen.

In conventional construction glass panels are mounted in metal frames which carry hinges for connecting two panels together in the case of a folding door, pivot posts for mounting the door in a stationary frame, guide posts for guiding the movements of the door in a stationary frame and spring catches to hold the door closed. Each door panel frame is then covered with trim strips to impart a neat and attractive appearance to the door panels.

The assembly of these parts requires screws or welds which further complicate the construction and increase the cost of manufacture as well as providing a great number of points of possible failure of the door in normal use, thereby increasing the likelihood of customer dissatisfaction with the product.

Objects of the present invention are therefore to provide an improved glass door for a fireplace screen, to provide a door of more simple and economical construction with fewer parts and lower manufacturing costs, and to provide a door which may be assembled quickly without screws or welds in its main parts.

SUMMARY OF THE INVENTION

The present form of construction omits the usual metal frame supporting the glass pane. Hinges are mounted directly on channel trim strips on the adjacent edges of a pair of glass panes to provide a two panel folding door. The lower hinge includes a spring catch to hold the door closed.

The trim strips are secured in assembled relation on the horizontal and vertical edges of each glass pane by snap fit engagement with four corner connectors within the channels, without screws or welds. On one of the panels two of the corner connectors have pivot posts for mounting the door in a stationary frame and on the other panel two of the corner connectors have guide posts which slide in grooves in said frame.

Thus the door may be assembled quickly without any particular mechanical skill and without requiring welding equipment and the services of skilled welders. This construction thereby not only reduces the number of parts but also greatly facilitates the assembly operation thereby reducing the manufacturing costs to a considerable extent.

The invention will be better understood and the foregoing and other objects and advantages will become apparent from the following detailed description of the preferred embodiment illustrated in the accompanying drawings. Various changes may be made in details of construction and arrangement of parts and certain features may be used without others. All such modifications within the scope of the appended claims are included in the invention.

BRIEF DESCRIPTION OF THE DRAWINGS

FIG. 5 is a rear elevation view with parts broken away showing the construction of the left door in FIGS. 1 and 2;

FIG. 6 is an enlarged view of line 6—6 in FIG. 5;

FIG. 7 is a view on the line 7—7 in FIG. 5;

FIG. 8 is an enlarged perspective view of the upper left corner of the door in FIG. 5 with parts broken away; and FIG. 9 is a perspective view of the lower hinge interconnecting the two door panels in FIGS. 2 and 5.

DESCRIPTION OF THE PREFERRED EMBODIMENT

Figure 1:
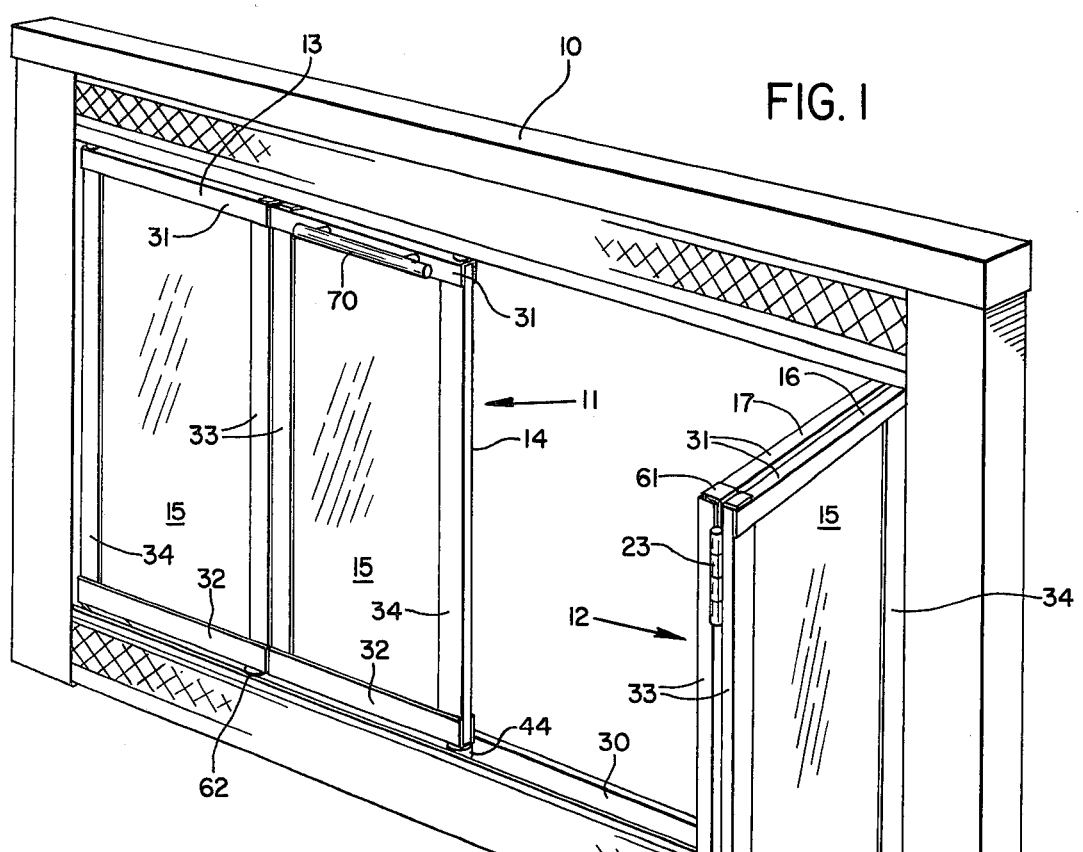
FIG. 1 is a perspective view of a fireplace screen embodying the invention.

In FIG. 1 the stationary retangular frame 10 is adapted to be mounted against the front face of the fireplace surrounding the fireplace opening. Mounted in frame 10 are a left folding door 11 and right folding door 12. Door 11 comprised a panel 13 and a panel 14, each containing a pane of glass 15. Similarly, the right door 12 comprises a panel 16 and a panel 17, each containing a pane of glass 15.

Left door panels 13 and 14 are connected together by an upper hinge 21 and a lower hinge 22 and right door panels 16 and 17 are connected together by an upper hinge 23 and a lower hinge 24. Center hinges may be provided if necessary. Left door 11 is mounted in frame 10 by means of upper and lower pivot posts 26 and 27 in FIG. 2 extending from panel 13. Panel 16 of right door 12 is similarly pivotally mounted in frame 10.

The upper and lower pivot posts 26 and 27 are received in the apertured free ends of leaf spring members 28. The opposite ends of members 28 are secured by bolts 29 in upper and lower stationary channel members 30, in frame 10. Upper channel 30 faces downward and lower channel 30 faces upward.

By lifting and tilting the door the lower pivot post 27 may be disengaged from leaf spring member 28 allowing upper pivot post 26 to be withdrawn from upper leaf spring member 28 whereby the whole door is conveniently removable from frame 10 for cleaning or other purposes. To re-install door 11 upper pivot post 26 is inserted in the apertured end of upper leaf spring member 28 with the door in tilted position. Then by lifting the door slightly and bringing it into vertical position pivot post 21 may be snapped into the apertured end of the lower leaf spring member 28 to return the door to its assembled position shown in FIG. 2.

FIG. 5 is a rear elevation view of left door 11 showing the panel construction which omits the usual frame members. The upper edge of each pane of glass 15 is inserted in an upper horizontal channel trim strip 31 and the lower edge is inserted in a lower horizontal channel trim strip 32. Similarily, the hinge edge of each pane of glass 15 is inserted in a vertical channel trim strip 33 and the opposite edge is inserted in a vertical channel trim strip 34.

Figure 2:
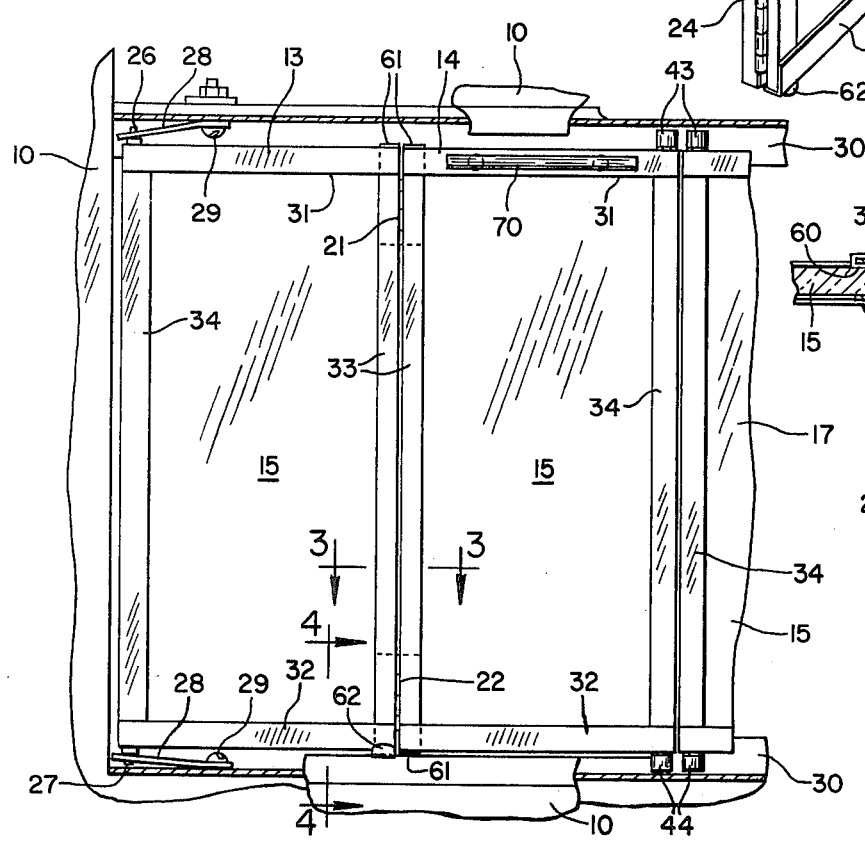
FIG. 2 is a front elevation view of the left side of the fireplace screen with parts broken away.
Figure 3:
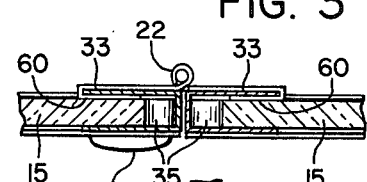
FIG. 3 is a view on the line 3—3 in FIG. 2.

On the back side of each panel 13 and 14 the vertical trim strips 33 and 34 overlie horizontal trim strips 31 and 32 as seen in FIG. 5 while on the front sides of the panels the horizontal trim strips 31 and 32 overlie the vertical trim strips 33 and 34 as seen in FIGS. 1 and 2.

On the back side of each panel 13 and 14 the upper and lower horizontal trim strips 31 and 32 are locked into fixed relationship with vertical trim strips 33 and 34. This interlocking relationship is established and maintained on hinge edges of the panels by a pair of indentical corner connectors 35 disposed within the channels of the trim strips at the upper and lower corners of glass pane 15.

At the opposite vertical edge of panel 13 the vertical and horizontal trim strips are locked in assembled relation by means of an upper pivot post connector 36 and a lower pivot post connector 37. These pivot post connectors include the pivot posts 26 and 27 previously mentioned in FIG. 2.

Panel 14 is similar to panel 13 except that vertical trim strip 34 is locked in assembled relation with horizontal trim strips 31 and 32 by corner guide post connectors 41 and 42. These guide post connectors have vertical projecting guide posts 43 and 44 which slide in the upper and lower channels 30 of stationary frame 10 in FIGS. 1 and 2.

As shown in FIG. 8, guide post 43 is elliptical with its major axis transverse to the pane of glass 15. The length of the major axis is almost equal to the inside width of channel 30 so that when doors 11 and 12 are closed together the guide posts 43 and 44 hold the meeting edges of the doors in alignment with each other. Guide post 44 is the same as guide post 43.

When doors 11 and 12 are folded to open positions, as illustrated by door 12 in FIG. 1, the guide posts rotate so as to orient their major axis into alignment with channels 30 allowing the guide posts to pass by any ash or fine debris in lower channel 30 without obstructing the movements of the doors.

Guide post connector 41 is illustrated in detail in FIG. 8 which corresponds to the upper left corner of FIG. 5. The body of the connector is L-shaped having a thickness corresponding to the thickness of glass pane 15, the horizontal and vertical arms of the connector fitting over the corner of the glass as shown.

On the inside face of each arm of the connector is a projecting lug 50 which locks into a correspondingly shaped opening 51 in the inside flanges of channel trim strips 31 and 34. The outwardly facing side of the connector is contained within the channels of the trim strips without any projections 50 on the connector and without any openings 51 in the outer face of the trim strips whereby the connector is concealed in a front or outside view of the door as seen in FIGS. 1 and 2.

Trim strips 31–34 are preformed of resilient metal with convergent side flanges on the channels whereby the flanges must be sprung apart in placing the trim strips over the edges of glass pane 15 and the corner connectors, as illustrated with respect to connector 41. As the trim strips are pressed into positions against the horizontal and vertical edges of the corner connectors the flanges of the trim strips are spread apart until the openings 51 come into register with lugs 50 whereupon lugs 50 enter these openings allowing the inner flanges of the trim strips to snap down against the inside face of glass pane 15. The trim strips are thereby locked into assembled position relative to each other and confine the edges of the glass in the channels of the trim strips forming a structural frame for the panel.

As shown in FIG. 8 the corner connectors are preferably made as metal die castings. In order to maintain parallel sides on lugs 50 without any taper or base fillet in the openings 51, the arms of the connector are preferably relieved in a recess 52 around each lug 50. This allows a fillet at the base of lug 50 without interferring with the fit or the lug in opening 51.

Lower guide post connector 42 is a mirror image or upper guide post connector 41. Lower pivot post connector 37 is indentical to upper guide post connector 41 except for the addition of the pivot post projection 27. Upper pivot post connector 36 is a mirror image of lower pivot post connector 37. Corner connectors 35 are the same as upper guide post connector 41 in FIG. 8 except that they lack the projecting guide post 43. The corner connectors 35 are entirely contained within the channels of the trim strips 31, 32 and 33 except for the lugs 50 which are received in openings 51.

Figure 4:
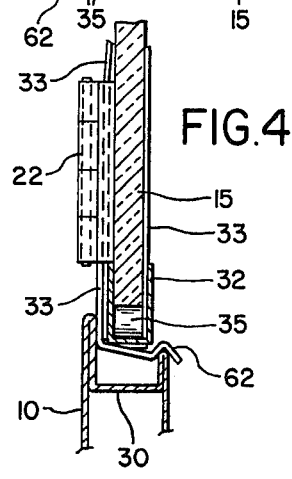
FIG. 4 is a view on the line 4—4 in FIG. 2.

Lower hinge 22 is shown in detail in FIG. 9. Each leaf of the hinge has a reversely bent tongue 60 which is engaged under the inside flange of vertical trim strip 33 as shown in FIG. 7. At its lower end one leaf of the hinge has a perpendicular flange 61 which underlies the lower edge of door panel 14 while the lower end of the other hinge leaf has an outwardly projecting spring catch finger 62 to engage the outer flange of lower stationary frame channel 30 as shown in FIG. 4.

Hinge 22 also has a snap fit type of locking engagement with the door panel for quick assembly without screws or welding. As seen in FIGS. 5, 7 and 9 each hinge leaf has a tab or lug 63 struck out from the hinge leaf which enters opening 64 in vertical trim strip 33 to lock the hinge in assembled position on both door panels.

Upper hinge 21 is the same as lower hinge 22 except for the omission of spring catch finger 62. Each leaf of the upper hinge has a perpendicular flange 61 overlying the top edge of the door panel.

Right door 12 is a mirror image of left door 11, assembled as thus far described without screws or welds and without the conventional panel frame members. The only screws required are for mounting handles 70 on upper trim strips 31.

What is claimed is:

1. In a fireplace screen, a door panel comprising a rectangular pane of glass, horizontal and vertical channel trim strips mounted on said glass with the edges of the glass inserted in said channels between opposite side flanges of the channels, openings in end portions of said side flanges of said channels adjacent the corners of the glass, L-shaped corner connectors at the corners of the glass having horizontal and vertical arms of the same thickness as said glass disposed in said channels along the edges of the glass, lugs on said arms engaged in said openings to hold said trim strips in assembled relation on the glass and form a structural frame for the glass, all of said openings and lugs being disposed on the inside face of the panel, said trim strips being formed of resilient material and said side flanges of said channels being formed in convergent relationship so as to bear against opposite faces of the glass and engage said lugs with a snap fit in assembly, and vertical pivot posts on two of said corner connectors for mounting said panel in a fireplace screen frame, said side flanges on said channel trim strips overlapping each other at the corners of said pane, said side flanges on the horizontal trim strips overlapping the side flanges on the vertical trim strips on the outside face of the panel and the side flanges on the vertical trim strips overlapping the side flanges on the horizontal trim strips on the inside face of the panel.

2. In a fireplace screen, a pair of door panels, each door panel comprising a rectangular pane of glass, horizontal and vertical channel trim strips mounted on said glass with the edges of the glass inserted in said channels between opposite side flanges of the channels, openings in end portions of said side flanges of said channels adjacent the corners of the glass, L-shaped corner connectors at the corners of the glass having horizontal and vertical arms of the same thickness as said glass disposed in said channels along the edges of the glass, lugs on said arms engaged in said openings to hold said trim strips in assembled relation on the glass and form a structural frame for the glass, all of said openings and lugs being disposed on the inside face of the panel, said trim strips being formed of resilient material and said side flanges of said channels being formed in convergent relationship so as to bear against opposite faces of the glass and engage said lugs with a snap fit in assembly; vertical pivot posts on two of said corner connectors in one panel for mounting said panel in a fireplace screen frame; hinges connecting said panels together to form a folding door, each hinge having a pair of hinge leaves with reversely bent tongues engaged under said flange portions of the trim strips on adjacent vertical edges of the two panels to secure the hinge to said panels, flanges on the leaves of one hinge arranged to overlie the top edges of said panels and flanges on the leaves of another hinge arranged to underlie the bottom edges of said panels.

3. In a fireplace screen, a door panel comrpising a rectangular pane of glass, horizontal and vertical channel trim strips mounted on said glass with the edges of the glass inserted in said channels between opposite side flanges of the channels, openings in end portions of said side flanges of said channels adjacent the corners of the glass, L-shaped corner connectors at the corners of the glass having horizontal and vertical arms of the same thickness as said glass disposed in said channels along the edges of the glass, lugs on said arms engaged in said openings to hold said trim strips in assembled relation on the glass and form a structural frame for the glass, all of said openings and lugs being disposed on the inside face of the panel, said trim strips being formed of resilient material and said side flanges of said channels being formed in convergent relationship so as to bear against opposite faces of the glass and engage said lugs with a snap fit in assembly, and vertical pivot posts on two of said corner connectors for mounting said panel in a fireplace screen frame; a second substantially identical panel hinged at one vertical edge to said first panel to form a folding door, and vertical upper and lower sliding guide posts on two of said corner connectors at the opposite vertical edge of said second panel, said guide posts being elliptical with the major axis of the ellipse perpendicular to the pane of glass in the second panel, said guide posts being adapted to slide in uper and lower horizontal guide channels in said fireplace screen frame, said major axis of the ellipse for each guide post being transverse to the guide channel when the door is closed, to position said opposite edge of said second panel, and said major axis rotating into alignment with the guide channel when the door is folded to open position to allow the lower guide post to pass by fine debris in said lower guide channel.

4. In a fireplace screen, a vertical rectangular frame having a downwardly facing upper horizontal guide channel and an upwardly facing lower horizontal guide channel, a folding door in said frame having a first door panel hinged at one vertical edge thereof to said frame, a second door panel in said frame hinged at one vertical edge to the opposite vertical edge of said first panel, and vertical upper and lower guide posts on the opposite vertical edge of said second panel slidable and rotatable in said guide channels when the door is opened and closed, said guide posts being elliptical with the major axis of the ellipse perpendicular to said second panel, said major axis of the ellipse for each guide post being transverse to its guide channel when the door is closed, to position said opposite edge of said second panel, and said major axis rotating into alignment with the guide channel when the door is folded to open position to allow the lower guide post to pass by fine debris in said lower guide channel.

* * * * *